April 14, 1959 H. MUTCHNIK 2,882,110
LATERALLY MOVING FURNITURE LEG FASTENER
Filed April 18, 1957 2 Sheets-Sheet 1
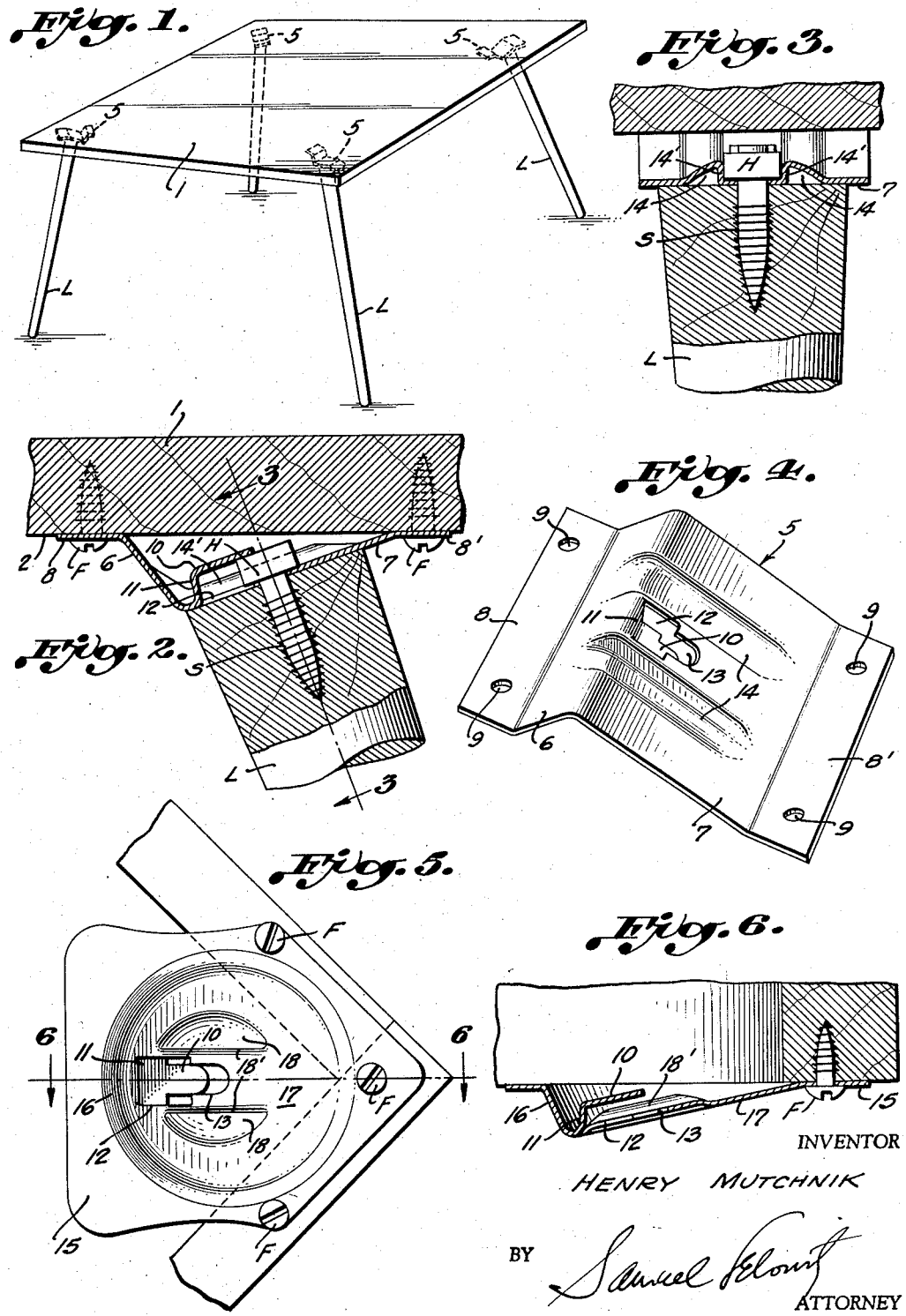
INVENTOR
HENRY MUTCHNIK
BY
ATTORNEY April 14, 1959 H. MUTCHNIK 2,882,110
LATERALLY MOVING FURNITURE LEG FASTENER
Filed April 18, 1957 2 Sheets-Sheet 2
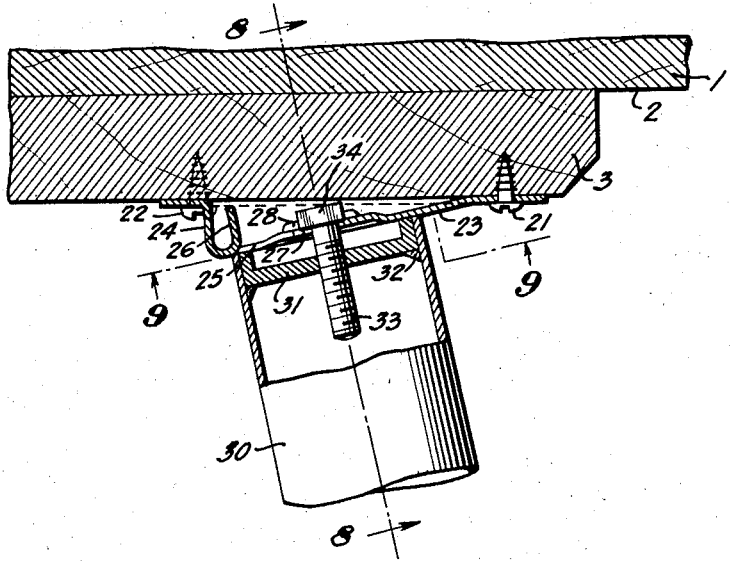
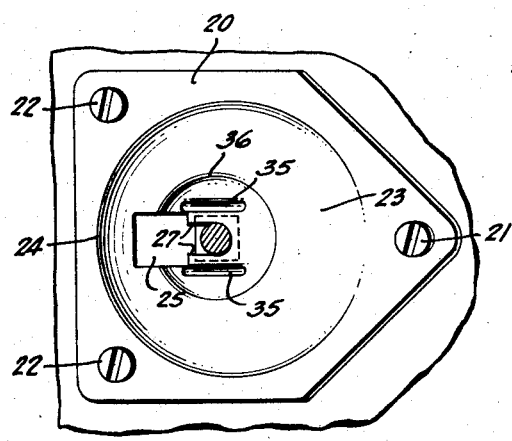
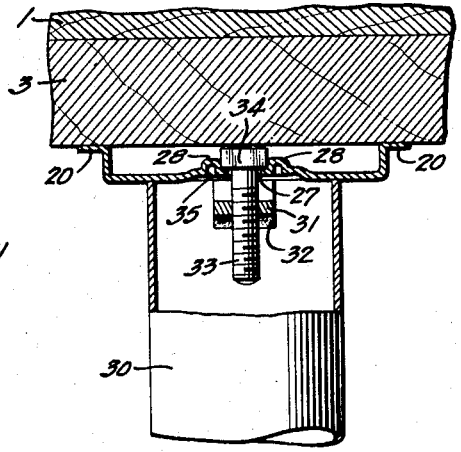
INVENTOR
HENRY MUTCHNIK
BY
ATTORNEY

United States Patent Office 2,882,110
Patented Apr. 14, 1959

2,882,110

LATERALLY MOVING FURNITURE LEG FASTENER

Henry Mutchnik, Baltimore, Md.

Application April 18, 1957, Serial No. 653,687

5 Claims. (Cl. 311—112)

This invention relates to hardware fastener units for furniture legs adapted for knockdown furniture and particularly to fastener assemblies for detachably interconnecting the legs of tables or chairs with the surfaces supported thereby.

This application is a continuation-in-part of my application Serial No. 574,164, filed March 27, 1956, now abandoned.

It is the object of the present invention to provide an economical fastener assembly which may be applied to the undersurface of furniture units, such as tables or chairs, and to which may be rapidly connected the leg elements at the time of assembly without need of any special tools or skill.

It is another object of the invention to mount simple hardware units on the undersides of furniture at predetermined angularities so that these may be shipped in compact knockdown condition in readiness for connection therewith of leg elements which are readily affixed to the furniture units without need for any accurate interfitting of the parts to obtain the desired disposition of the leg elements with respect to the furniture units.

The invention is particularly useful in the assembly of table tops with wooden or metal legs requiring a minimum number of inexpensive hardware units to attain the desired results. Each hardware unit is adapted for detachable coupling with a polygonally headed bolt mounted on the upper end of a table leg, which may preferably consist of a simple square-headed bolt rotatably engaging the end of the leg so that the square head projects beyond the end thereof. The hardware unit cooperating with this square-headed bolt, which unit is affixed to the underside of the table top, consists essentially of a stamped metal seat having a slot therein, the width of which is slightly larger than the shank of the bolt to receive the latter, and is further provided with inwardly extending restraining flanges on each side of the slot which are spaced to accommodate the square head of the bolt while restraining the rotary movement thereof. To assemble the leg unit to the underside of the furniture surface it is necessary only to insert the bolt into the slot by a translating movement and to impart a slight rotary movement to the table leg while the bolt-head is restrained by the flanges in the stamped metal seat, which effects a tight engagement of the end of the leg against the seat and the undersurface of the furniture unit.

The hardware units in accordance with the invention, in their preferred form, consist of a unitary sheet metal stamping which utilizes keyhole-shaped metal portions stamped from the plane of the metal seat to define the opening for the bolt head and the slot for the bolt shank, as a positive stop for the head of the bolt when the end of the leg is brought into engagement with the seat therefor. Therefore, the assembly operation is expedited since the two translating movements at right angles to each other fix with exactitude the location of the head of the bolt between the restraining flanges preparatory to the rotary movement to tighten the end of the leg against its seat.

Other objects and purposes will appear from the detailed description of the invention following hereinafter, taken in conjunction with the accompanying drawing, wherein Fig. 1 is a perspective view illustrating the application of the invention to a table unit which may be a kitchen table, coffee table or the like;

Fig. 2 is a vertical sectional view of the hardware unit in accordance with the invention affixed to the underside of the table, and the upper end of a table leg in engagement therewith;

Fig. 3 is a vertical sectional view along line 3—3 of Fig. 2;

Fig. 4 is a perspective view of the hardware unit shown in Figs. 1 to 3;

Fig. 5 is a bottom plan view of a second embodiment of the invention applied to a corner frame of a table or chair;

Fig. 6 is a vertical sectional view along line 6—6 of Fig. 5;

Fig. 7 is a vertical sectional view of a metal tubular leg and table assembly representing another embodiment of the invention;

Fig. 8 is a vertical sectional view along line 8—8 of Fig. 7; and

Fig. 9 is a horizontal sectional view along line 9—9 of Fig. 7.

As shown in Figs. 1 to 4 of the drawings, a table top 1 has affixed to the underside 2 thereof a plurality of hardware units 5 in accordance with the invention. The hardware units are stamped from sheet metal in order to form therein fastening flanges 8 and 8' on the opposite ends thereof having bridged therebetween a sharply bent face 6 adjacent to flange 8 and a face 7 of more gradual inclination adjacent to fastening flange 8'. A plurality of holes 9 are stamped in the fastening flanges 8 and 8' for the entry thereinto of screw fasteners F and the angular disposition of the hardware units 5 may be arranged to direct the seating faces 7 in any desired direction. For example, as shown in Fig. 1, these are arranged to direct the legs towards the corners of the table.

A keyhole slot, composed of an enlarged portion 12 and a narrower portion 13, is stamped from the mid-portion of the seat face 7 adjacent to the crest or juncture of the bent faces 6 and 7, and the metal stamped from this keyhole slot is utilized to form an end face 11 extending transversely to the plane of the metal and a tongue 10 extending from end face 11 in a plane substantially parallel to face 7. Indentations 14 are impressed in the face 7 on each side of the keyhole slot in order to form restraining flanges 14' at the opposite edges of the slot.

The table legs L, which may be formed of wood, metal, plastic or any other material, have mounted in the end thereof a screw bolt S having a polygonal head H. As shown in the drawings, this head is of square outline and is of sufficient size to pass through the enlarged portion of the keyhole slot 12 to seat on the inside face of the seat surface 7 while the shank of the bolt may be passed into the narrow portion 13 of the slot. This translating movement of the bolt is facilitated by the end wall 11 of the L-shaped tongue as well as the stop 10 in order to more easily guide the bolt into the slot 13 whereat the same is seated between the restraining flanges 14' at the boundaries of the stampings 14 formed in the wall 7. These restraining flanges serve to restrain rotary movement of the screw bolt so that when the table leg L is rotated the same is advanced against the seating face 7 to seat the upper end of the table leg tightly thereagainst. This requires either a partial revolution or more, depending upon the extent of protrusion of the headed bolt beyond the table leg at the time of its insertion into the keyhole slot.

The hardware unit 5 may be stamped to obtain steep angularities of the seating face 7 with respect to the freely extending attaching flanges 8 and 8'. Of course, these angularities may be varied in accordance with different requirements. In such cases when a slight angularity is adequate, a surrounding circumferential flange 15 may be provided, as shown in Figs. 5 and 6, which construction is especially useful in providing seats for legs at the framed corners of chairs or tables. The pentagonally-shaped attaching flange 15 is provided with openings therein for fastening screws F, and the seating face 17 is pressed from the plane of the attaching flanges, presenting the face 16 of maximum displacement at the portion thereof remote from the corner of the frame.

A keyhole-shaped slot 12, 13 as described above, is stamped from the plane of the seat 17 adjacent to the point of maximum displacement and the metal removed therefrom forms the L-shaped end stop 11—10 for the head of the bolt that is introduced into the portion 13 of the slot wherefrom it is moved transversely into the narrowed portion 13 for confinement between the restraining flanges 18' marking the lateral walls of the depressions 18 which are stamped on the opposite sides of the slot.

The furniture legs bearing polygonally-headed screw bolts are tightened against the seating face 17 by a rotary movement of the legs, as described above.

In the embodiment illustrated in Figs. 7 to 9, the hardware unit is of modified construction and is affixed to the underside of a cleat 3, which, in turn, is mounted by fastening bolts or adhesive to the underside of the table 1. The hardware unit 20 of this embodiment is of pentagonal outline and is affixed to the underside of the cleat 3 by means of fastening screws 21 and 22. By virtue of the limited space between the seating face and the fastening cleat, the bolt head is seated in its repository between the restraining flanges without the benefit of the stop afforded by the tongues 10 extending in parallel to the seating face in the embodiment above.

The embodiment of the hardware unit disclosed in Figs. 7 to 9 consists of a pressed metal seat which is formed with a centrally disposed truncated cylindrical projection swaged from the affixing plane 20 of the hardware unit and terminating in the inclined seating plane 23. This cylindrical projection is swaged with a deep wall 24 at the end of the unit which receives the pair of fastening screws 22, which wall decreases gradually to the side adjacent the pointed end of the unit receiving the fastening screw 21 whereat the cylindrical projection merges smoothly into the plane of the fastening flange 20. Thereby the seating plane 23 of the cylindrical projection is inclined relatively to the affixing plane 20 to dispose the leg which is seated against plane 23 at a corresponding angle to the vertical.

The center of the inclined seat 23 is punched to provide an enlarged recess 25 by the pressing of tongue 26 therefrom, which opening is reduced to form slot 27 which is of a width sufficient to accommodate the shank of the threaded bolt extending from the upper end of the table leg. In addition, depressions 35, which may be of rectilinear outline, as shown in Fig. 9, or which may be of segmental outline, are swaged from the outer surface of the unit to form restraining flanges 28 (Figs. 7 and 8) on the interior thereof. In other words, the swaging tool for forming the flanges 28 may be straight sharp tools, as indicated by the resulting depressions 35 in Fig. 9, or these may be extended to the perimeter 36 at the center of the truncated cylindrical projection as long as the restraining flanges 28 are formed on the interior of the hardware unit for accommodating the square head 34 of the bolt therebetween while restraining rotary movement thereof.

The angularity and depth of the internal cavity resulting from the outward pressing of the truncated cylindrical projection, which is clearly indicated in Fig. 7, is adequate to accommodate the head 34 of the threaded bolt 33 which threadedly engages the cross-bar 31 welded at 32 to the upper end of the tubular metal leg 30. The bolt-head is introduced through the opening 25 and is guided from the inturned stop 26, which may extend across the entire width of the slot 25 or only at the center thereof, into the channel between the restraining flanges 28, the shank of the bolt below the head being received in the slot 27 until the same is finally seated at the end of the slot. Thereafter, rotary movement of the leg 30 while the bolt 33 is restrained against movement by virtue of the restraint imposed on the head 34 by the flanges 28, results in a tight seating of the upper end of the leg against the inclined external seating face 23 of the hardware unit. The hardware unit is so positioned as to control the direction of the angularity of the leg corresponding to the desired furniture designs sought to be attained.

While the hardware unit illustrated in Figs. 7 to 9, which is affixed to the undersurface of the table top, is shown used in conjunction with a tubular metal leg, the same may as well be used with a cylindrical or frusto-conical wooden leg of the type shown in Figs. 1 to 3, having a square-headed lag bolt threaded in the upper end thereof.

Also, if a perpendicular disposition of the legs is desired, the cylindrical projection may be truncated along a plane parallel to the table top so that the seating face is parallel to the top rather than inclined relative thereto.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:

1. A hardware attachment for affixation to the underside of a piece of furniture and adapted for interengagement with a polygonally-headed bolt extending from the end of a furniture leg, said attachment comprising a unitary sheet metal plate having coplanar fastening flanges extending therefrom and a main seating portion extending in a plane other than said fastening flanges for tight seating of the end of the furniture leg thereagainst, said main seating portion having a keyhole-shaped slot therein for accommodating the head of the bolt at the large portion of the slot and the shank of the bolt adjacent to said head at the narrow portion of the slot, and a pair of integral confining flanges extending transversely from the plane of the metal plate opposite the seating face of said seating portion and on opposite sides of said slot for receiving the opposite sides of the bolt head while restraining rotary movement thereat.

2. An attachment as set forth in claim 1 wherein the metal stamped from the seating portion to form the keyhole-shaped slot is retained integrally with the metal plate at the large end thereof and is bent in L-shaped form from the plane thereof to form an end guide for the head of the bolt and a stop therefor as the same is moved to the narrow portion of the slot.

3. A fastener assembly for detachably connecting a furniture leg to the underside of a piece of furniture, comprising a bolt rotatably mounted in the end of said leg and provided with a square head projecting above said end, a slotted sheet metal seat affixed to said underside comprising a peripheral attaching flange and a cylindrical projection extending therefrom to form a repository for the head of the bolt interiorly thereof, an enlarged opening in the face of said projection merging into a narrower slot, the width of said slot being slightly larger than the diameter of the shank of the bolt adjacent to said head and said opening being sufficiently large to receive the head of the bolt, swaged restraining flanges bordering the longitudinal edges of said slot in said repository and integral with said seat to accommodate said square head while restraining rotary movement thereof, whereby the insertion of the end of the bolt into the slotted sheet metal seat through said opening followed by a rotary movement of the leg result in a tightening engagement of the end of the leg with said seat at the exterior of said cylindrical projection.

4. A fastener assembly as set forth in claim 3 wherein said cylindrical projection terminates in a plane at a slight anglarity with respect to the plane of said attaching flange to impart a corresponding angularity to the table leg with respect to a line perpendicular to the top of the table.

5. A hardware attachment for affixation to the underside of a piece of furniture and adapted for interengagement with a polygonally-headed bolt extending from the end of a furniture leg, said attachment comprising a unitary sheet metal plate having a main seating portion medially thereof for tight seating of the end of the furniture leg thereagainst, said main seating portion having a slot stamped therein by displacing the metal from the plane thereof, said slot being of generally keyhole configuration and comprising an enlarged part and a narrow part extending therefrom with the stamped metal being integral with the seating portion at the junccction of the enlarged part therewith and displaced rearwardly therefrom for at least the depth of the bolt and then bent parallel to the plane of the seating portion for the rest of the length of the stamped metal, said stamped metal key serving as a guide and stop for the head of the bolt as the same is inserted beyond said seating portion with the shank of the bolt in said narrow part, and a pair of integral confining flanges extending transversely from the plane of the metal plate opposite the seating face of said seating portion on opposite sides of said slot for receiving the bolt head while restraining rotary movement thereat.

References Cited in the file of this patent

UNITED STATES PATENTS

| | | |
|---|---|---|
| 655,358 | Smyth | Aug. 7, 1900 |
| 813,406 | Cornell | Feb. 27, 1906 |
| 918,665 | Gingrich | Apr. 20, 1909 |
| 2,545,347 | Embree | Mar. 13, 1951 |
| 2,809,876 | Huff | Oct. 15, 1957 |

FOREIGN PATENTS

| | | |
|---|---|---|
| 68,736 | Denmark | Mar. 14, 1949 |